United States Patent [19]

Shinaver

[11] 4,424,128

[45] Jan. 3, 1984

[54] FILTER DEVICE FOR DIESEL ENGINES

[75] Inventor: Lawrence P. Shinaver, Ceres, Calif.

[73] Assignee: Applied Diesel Engineering, Inc., San Francisco, Calif.

[21] Appl. No.: 417,692

[22] Filed: Sep. 13, 1982

[51] Int. Cl.³ .......................................... B01D 27/08
[52] U.S. Cl. .................................. 210/238; 210/119; 210/133; 210/306; 210/444
[58] Field of Search ............... 210/800, 801, 803, 804, 210/806, 168, 298, 299, 320, 305, 306, 238, 119, 133, 311, 443, 444, 445, 446, 448

[56] References Cited

U.S. PATENT DOCUMENTS 4,017,397 4/1977 Copeland ........................... 210/305

Primary Examiner—Frank Sever
Attorney, Agent, or Firm—Limbach, Limbach & Sutton

[57] ABSTRACT

The subject invention relates to a filter apparatus for separating fluids of varying density. The subject filter is particularly adapted for use with diesel engines. The apparatus includes a new and improved baffle system which increases the separation of fluids. In addition, a unique filter cartridge is disclosed which is readily replaceable. The cartridge also functions to reduce the likelihood of the formation of air pockets.

13 Claims, 5 Drawing Figures

FILTER DEVICE FOR DIESEL ENGINES

DESCRIPTION

1. Technical Field

The subject invention relates to a new and improved fluid filter device particularly adapted for use with diesel engines. The subject apparatus includes an improved baffle system for increasing the efficiency of separation. In addition, the apparatus is designed to facilitate servicing.

2. Background Art

There is considerable interest in developing filtration systems for use with diesel engines. Unlike a typical gasoline engine, an engine operating on diesel principles is particularly sensitive to the presence of water in its fuel supply. Accordingly, a variety of devices have been developed which are intended to remove a large percentage of water from the fuel supply in order to improve the operating efficiency of the engine.

Most known filters are designed to take advantage of the fact that water has a heavier density than diesel fuel. Clearly, if the fluids were just allowed to stand, a certain degree of separation could be achieved. However, since the fluid must be pumped to the engine in a continuous manner, an active means must be provided to separate the fluids.

It is well known that fluids of different densities can be separated by passing the stream through a baffle system. A baffle system serves two primary functions. The first is to channel the flow through rapid changes in direction. Fluids of different density will respond to changes in direction, in a slightly different manner, permitting separation. Another function of the baffle system is to provide a plurality of impingement surfaces. Fluids of different densities will deflect of a surface at varying angles also improving separation. Accordingly, the design of the baffle system can greatly affect the efficiency of the filter.

Another important factor affecting the efficiency of a baffle design concerns the possibility of reentrainment of the water in the fuel flow. More particularly, the heavier water molecules which are initially separated from the fuel flow must be channeled to a collection area without being reentrained in the fuel flow. Accordingly, to increase efficiency, it would be desirable to design a baffle system which minimizes reentrainment.

Many of the devices found in the prior art include a filtration system in addition to a baffle system. Typically, after the fluid flow has been subjected to the baffle construction, it is passed through a filter, prior to exiting the apparatus. The filter, which may be formed from various paper compositions, is intended to further remove any water molecules left in the flow. The filter also functions to remove any large particulates in the flow of fuel.

The construction of the baffle and filter systems are significant factors in filter designs. However, an even more important factor in filter design relates to its serviceability. As can be appreciated, filter devices must be mounted somewhere adjacent the diesel engine in a location which permits servicing. For example, the chamber which collects the water must be drained at frequent intervals. In addition, the filter element must be periodically replaced. Because the engine compartment is usually quite crowded, the design of the filter with regard to servicing, is particularly important. As will be discussed in detail below, the subject invention not only includes an improved filtration system, but is designed to facilitate servicing.

As mentioned above, there are a number of filtration devices found in the prior art. Two examples of such prior art devices can be found in U.S. Pat. No. 3,931,011, issued Jan. 6, 1976, to Richards et al.; and U.S. Pat. No. 4,017,397, issued Apr. 12, 1977, to Copeland. Both patents disclose devices which include a baffle system and a filter system. More particularly, a bottom sediment chamber is provided wherein the fuel flow is passed through a baffle system. The fuel flow is then directed upwardly into a filter chamber.

Both of these prior art devices have certain drawbacks. For example, in the Richards' device, the filter chamber is enclosed with an upper cover. In order to replace the filter element, this cover must first be removed to permit the element to be lifted upwardly out of the chamber. This design requires a clearance area, above the filter assembly, at least equal to the length of the filter element. Since the device is usually mounted in a crowded engine compartment, the clearance requirement limits the locations where the filter can be positioned.

Another shortcoming of the Richards' device relates to air pockets. More particularly, when passing the fluid flow through the apparatus, a certain amount of air will become separated from the flow. This air will tend to rise creating pockets adjacent the top of the filter. An air pocket in the chamber functions to reduce the effective size of the filter. In addition, a sudden surge of fuel can cause the air pocket to be entrained in the fuel flow, resulting in a flat spot, or cough in the engine, at a time when it should be operating at full efficiency.

The apparatus disclosed in the Copeland patent is intended to overcome the latter shortcoming associated with Richards' device. The Copeland device is also provided with a lower sediment chamber and an upper filter chamber. However, in the Copeland device, the fluid inlet and outlet ports are located at an equal level, at the top of the device. As pointed out in Copeland specification, by locating the fluid outlet port adjacent to top of the filter, the likelihood of forming an air pocket is substantially reduced. In contrast, any air tending to separate from the flow will be continuously channeled into the fuel flow, in a homogeneous manner.

While the device in Copeland overcomes one shortcoming of the Richards' device, it shares its other major weakness. More particularly, in order to locate the fluid ports adjacent the top of the filter, it is necessary to design the main support casting at the top of the device. The main support casting is used to fixedly mount the device in an automobile, since the fluid ports must be immovable with respect to the gas line in the engine. Accordingly, to service the device disclosed in Copeland, the entire housing below the support casting must be released and dropped downwardly, requiring extra clearance. Only after the entire housing is removed, can the filter element be replaced. As can be appreciated, the housing can be relatively difficult to handle since it is large and includes a sediment chamber filled with water and fuel. Thus, the replacement of a filter element in the Copeland device requires extra clearance and is an extremely awkward procedure.

Accordingly, it is an object of the subject invention to provide a new and improved filter device particularly adapted for use with diesel engines.

It is another object of the subject invention to provide a filter device having a new and improved baffle system.

It is a further object of the subject invention to provide a filter device having an improved baffle system which includes a unique means for channeling water directly to the sediment chamber thereby reducing the likelihood of its reentrainment in the fuel flow.

It is still another object of the subject invention to provide a filter apparatus having an improved baffle system which creates a unique flow path for the fuel thereby enhancing the efficiency of separation.

It is still a further object of the subject invention to provide a new and improved filter device which substantially reduces the likelihood of the formation of an air pocket.

It is still another object of the subject invention to provide a filter device having a unique cartridge means.

It is still a further object of the subject invention to provide a filter device having a unique cartridge which is readily removable to facilitate servicing.

DISCLOSURE OF INVENTION

In accordance with these and many other objects the subject invention provides for a new and improved fuel filter particularly adapted for use with diesel engines. The subject filter includes an improved baffle system for increased efficiency. In addition, a unique filter cartridge is disclosed which greatly facilitates the ease in which the device can be serviced.

The subject filter includes a sediment chamber having an open upper end. A plate is provided for covering the chamber and includes fluid inlet and outlet ports. The plate also includes a passageway to permit the upward flow of fluid. A baffle means is located in the chamber, adjacent the inlet port and controls the fluid flow prior to its passage out of the chamber.

In accordance with the subject invention, a new and improved cartridge means is removably mounted to the plate and covers the passageway therein. The cartridge includes an elongated, central tube, with the lower end thereof being in communication with the outlet port of the plate. A fluid entry means is provided adjacent the upper end of the central tube which functions to prevent the development of an air pocket in the filter, as discussed more fully hereinbelow. A filter element surrounds the central tube, with the outer surface thereof being spaced from the inner surface of the cartridge. Preferably, the cartridge is provided with a fluid impervious bottom wall, extending outwardly from the central tube and terminating at a point spaced from the inner surface of the cartridge. The wall is disposed below the bottom surface of the filter element and spaced above the plate to define a channel. In operation, fluid leaving the sediment chamber passes through the passageway in the plate and is deflected through the channel adjacent the bottom wall of the cartridge. The fluid then passes through the filter and into the fluid entry means of the central tube, prior to exiting through the outlet port. Preferably, the cartridge is of the spin-on type, which requires virtually no additional clearance for servicing.

The baffle system of the subject invention is intended to increase the efficiency of separation of the device. The baffle system includes a central tubular member in communication with the inlet port of the plate. The central tubular member extends downwardly into the sediment chamber. In accordance with the subject invention, a unique cup is disposed concentrically around the central tubular member. The cup has an open upper end and a bottom wall formed integrally with the outer surface of the tubular member. The bottom wall is provided with a plurality of apertures, while the side wall of the cup is spaced away from the inner surface of the sediment chamber to define a channel.

In use, fluid flowing through the central tubular member is directed upwardly through the channel, defined between the cup and the chamber, towards the filter. Heavier density fluids will tend to separate and drop back downwardly into the cup. This separation occurs due to variation in density, and in addition, due to the impingement of the fluid against the bottom wall of the plate and cartridge. The heavier density fluid which is caught in the cup is returned directly to the sediment chamber, through the apertures formed in the bottom wall. By this arrangement, the return flow of water is isolated from the rapid upward flow of fuel such that the likelihood of reentrainment is substantially reduced.

In the preferred embodiment of the subject invention, a conically shaped plug means is coaxially mounted adjacent the open end of the central tubular member. The apex of the plug is directed towards the bottom of the sediment chamber. In addition, the bottom wall of the cup is formed with a conical configuration with the apex thereof pointing upwardly. As will become apparent from the following detailed description, the above-described arrangement functions to provide two rapid reversals in the path of the fuel flow and increases the impingement surface area such that separation between the fluids is greatly enhanced.

Further objects and advantages of the subject invention will become apparent from the following detailed description taken in conjunction with the drawings in which:

BEST MODE FOR CARRYING OUT THE INVENTION

Figures 1, 2:
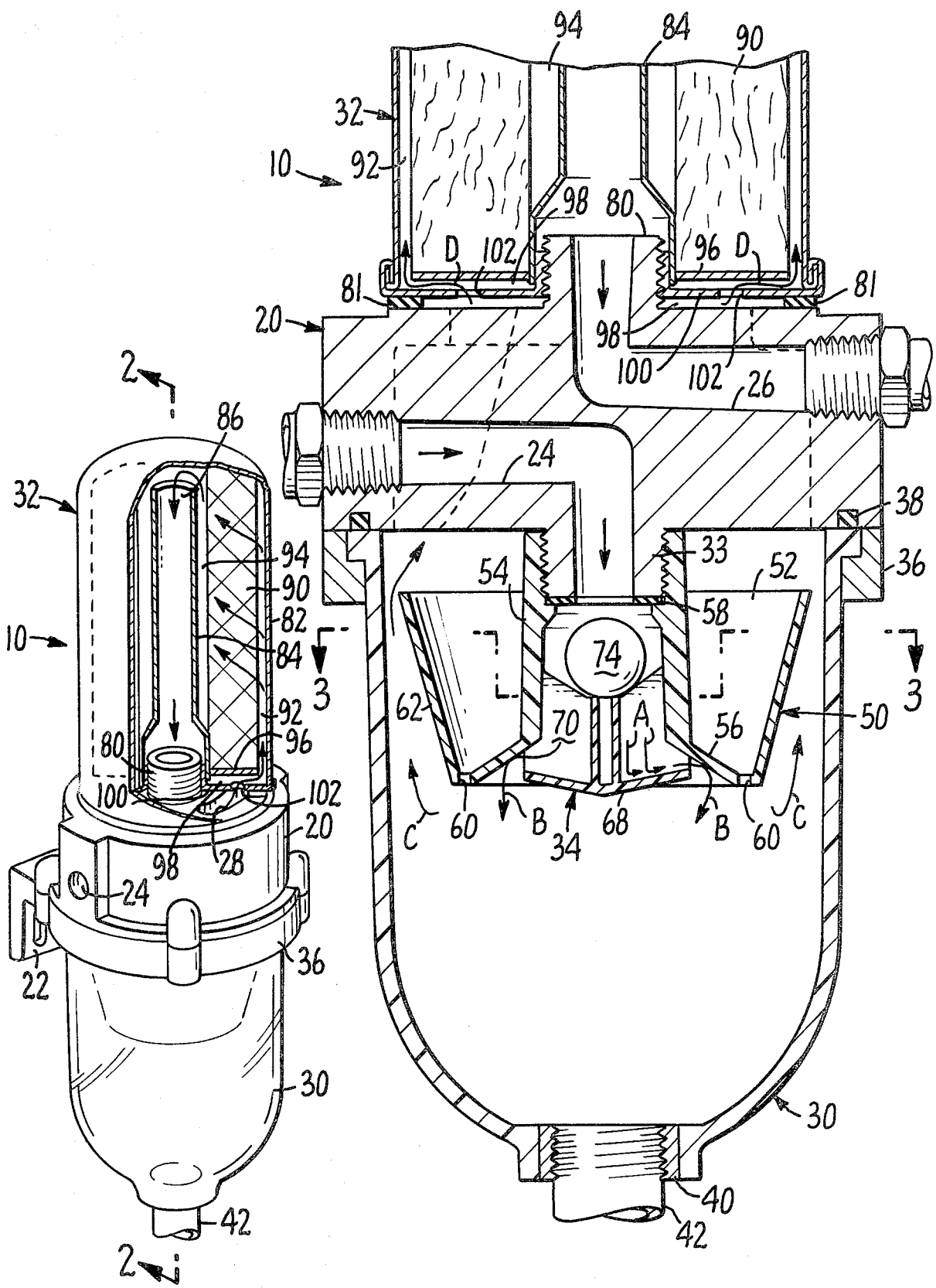
FIG. 1 is a perspective view, partially in section, of the new and improved filter means of the subject invention.
FIG. 2 is a partial, cross-sectional view, taken along the line 2—2 in FIG. 1, illustrating the flow path of fluids in the baffle system of the subject invention.
Figure 3:
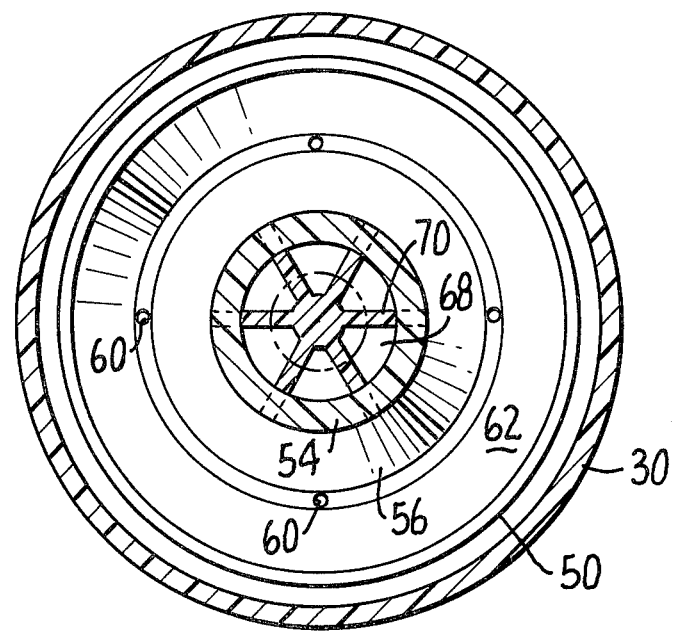
FIG. 3 is a cross-sectional view, taken along the line 3—3 in FIG. 2, of the baffle system of the subject invention.
Figure 4:
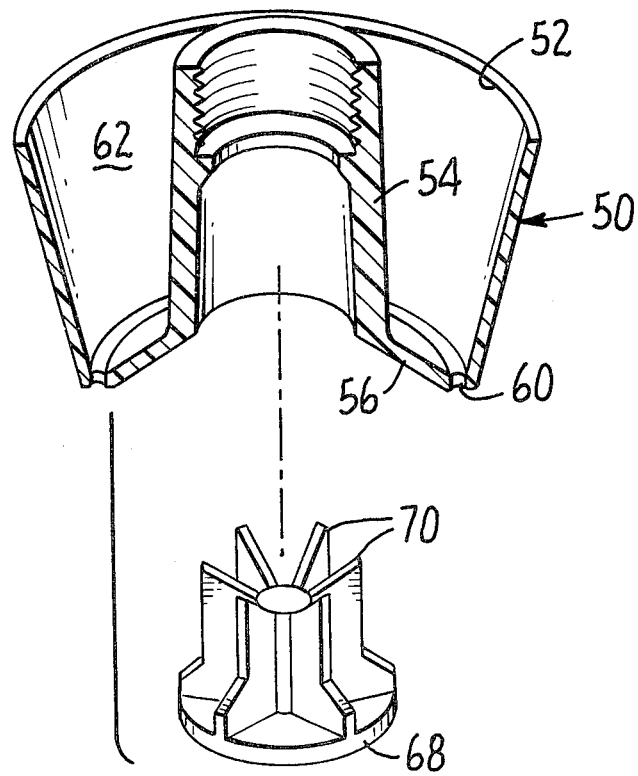
FIG. 4 is an exploded, perspective view of the elements in the baffle system of the subject invention.
Figure 5:
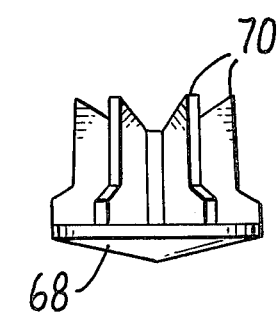
FIG. 5 is a side elevational view of the plug member of the baffle system of the subject invention.

Referring to FIGS. 1 and 2, the components of the subject invention will be briefly described. More particularly, a filter device 10 is illustrated which includes a central mounting plate 20, that is intended to be affixed via bracket 22, to the engine compartment of a vehicle. Plate 20 is provided with an inlet port 24 and an outlet port 26. In addition, passageways 28 are formed in plate 20 to permit fluid to pass between the bottom sediment chamber 30 and the upper filter cartridge 32.

Sediment chamber 30 is provided with a unique baffle system shown generally as 34. Baffle system 34 is intended to cause a high degree of separation between fluids of different densities, such as diesel fuel and water. After passing through the baffle system 34, the fluid flow is channeled upwardly into cartridge 32 where further separation is achieved. Cartridge 32 is removably mounted to plate 20 in a "spin on" manner such that replacement of the filter element can be accomplished quickly, easily and without the need for added clearance.

Referring now to FIGS. 1 through 5, the components of the subject filter apparatus 10 will be described in greater detail. Plate 20 is formed from a casting and supplies the main support for the apparatus. The fluid inlet and outlet ports 24, 26 are intended to be connected in-line with the fuel supply to the engine. Inlet port 24 is generally L-shaped in configuration with the outlet end 33 extending centrally into sediment chamber 30.

Sediment chamber 30 is bowl-like in configuration and is preferably formed from a see-through plastic material. Since the water collected in the chamber must be periodically emptied, the clear chamber facilitates visual inspection of the water level therein. Sediment chamber 30 is mounted to the lower surface of the plate 20 by a removable bracket 36. Preferably, an O-ring 38 is interposed between the upper edge of the sediment chamber and the lower edge of the plate to enhance the seal. The lower end of the sediment chamber is provided with a brass fitting 40 having threads formed therein. The threads are adapted to receive a spigot, shown partially at 42, to enable the sediment chamber to be drained.

Due to the varying density between water and fuel, movement of the fuel within the sediment chamber and then upwardly into the cartridge would cause a degree of separation. In an effort to enhance this separation, a new and improved baffle means 34 is mounted adjacent the end 33 of inlet port 24.

The baffle system 34 includes a cup 50 which has an open upper end 52. Cup 50 is provided with a central tubular member 54, formed integrally with bottom wall 56 of the cup. Central tubular member 54 is threadably mounted to the termination 33 of inlet tube 24 and is in communication therewith. By this arrangement, tubular member 54 forms an extension of the inlet tube. Preferably, an O-ring 58 is interposed between the cup and the end of the inlet port.

Bottom wall 56 of cup 50 is formed with a plurality of apertures 60 to provide a return path for water droplets, as discussed more fully hereinbelow. The side wall 62 of cup 50 slopes outwardly, with the upper edge thereof being spaced away from the side wall of the sediment chamber 30. The space between the side wall 62 of the cup and the sediment chamber defines a channel for the upward passage of fluid. In the preferred embodiment, the bottom wall of the cup also slopes upwardly, and defines a frusto-conical configuration with the apex pointing upwardly. The deflection angle of the bottom wall also serves to enhance separation.

The baffle system 34 may further be provided with a plug member 68 which is coaxially mounted adjacent the end of tubular member 54. Plug member 68 is provided with a conical configuration, with the apex thereof pointing downwardly towards the bottom of the sediment chamber. Plug member 68 is formed with a plurality of radially projecting flutes 70 for channeling the fluid flow. By properly tailoring the dimensions of flutes 70, plug member 68 may be press-fit within the central tubular member 54 during mounting.

In the preferred embodiment, a spherical element 74 is mounted above plug member 68. Spherical element 74 functions as a ball valve to inhibit the reverse flow of fluids. Accordingly, when fluids are flowing in through inlet port 24, element 74 is forced downwardly, onto the upper surface of the plug member, permitting fluids to pass into the chamber. In contrast, if there is a disturbance which would tend to reverse the flow, the ball will be forced upwardly in sealing enagement with ring 58 preventing the return flow.

Having described the components of the baffle system, their functions will now be discussed. In operation, fuel is supplied by a pump to the inlet port 24. The fuel is channeled into the central tubular member 54 of cup 50. The downward flow is then deflected upwardly by the conical surface of plug member 68, as illustrated by arrows A in FIG. 2. As illustrated by arrows B, the fluid flow is then redirected by the sloping bottom wall 56 of cup 50. The dual reversals in direction, in combination with the pair of impingement surfaces, greatly enhances the separation between fluids of different densities. Once the separation has occurred, the heavier water droplets will tend to settle out adjacent the bottom of the sediment chamber, rather than being swept upwardly with the fuel flow.

After the fuel flow has passed under the bottom wall 56 of cup 50, it is redirected upwardly as illustrated by arrows C. The flow is funneled into the channel defined between the side wall 62 of the cup and sediment chamber. The fluids continue to travel upwardly seeking passageways 28 formed in plate 20. During this upward flow, a considerable amount of water will tend to drop downwardly due to gravity. Some coalescence will occur because a portion of the flow impinges on the lower surfaces of the plate. Additional coalescence is also achieved when the flow hits the bottom wall of the cartridge 32, as discussed more fully hereinbelow.

Based on the reasons above, a considerable amount of water droplets are separated from the fluid flow as it moves upwardly towards the cartridge 32. In the prior art devices disclosed earlier, this return flow of water droplets was not provided a separate path and could easily be reentrained in the rapid upward flow of fuel. In contrast, the subject invention provides a unique means for permitting the water to settle out and be returned directly to the sediment chamber without being reentrained in the upward fuel flow.

This object is achieved by cup means 50. As can be appreciated, the open upper end 52 of cup means 50 extends practically the entire diameter of the sediment chamber. Accordingly, virtually all of the heavier water droplets travelling downwardly via gravity, are captured by cup 50. Apertures 60, formed in the bottom wall 56 of the cup provide a direct path for the return of the water to the sediment chamber. As can be appreciated, since the water does not have to pass through the high speed venturi of the fuel flow, the likelihood of the water being reentrained in that flow is substantially reduced.

As discussed above, the subject apparatus 10 also includes a new and improved cartridge system which overcomes many of the shortcomings found in the prior art devices. Most importantly, the entire cartridge 32 is designed to be removably mounted to plate 20. To achieve this result, one end of fluid outlet port 26 is defined by an upwardly projecting, threaded mount 80. Accordingly, cartridge 36 may be spun onto the threaded mount 80 when affixing the cartridge to the apparatus 10. Similarly, for removal, the cartridge may be spun off and replaced, with virtually no added clearance necessary. Preferably, an O-ring 81 is provided to enhance the seal between the plate 20 and the cartridge 32.

Cartridge 32 consists of an outer housing 82. Mounted within housing 82 is an elongated central tube 84. The lower end of central tube 84 is in communication with outlet port 26 of plate 20. The lower end of tube 84 is provided with threads for engagement with the threaded mount 80 of plate 20. Tube 84 is tapered towards its upper end where a fluid entry means 86 is provided. In the illustrated embodiment, the upper end of tube 84 is spaced from the top of cartridge 32. By providing a opening to tube 84, adjacent the top of the cartridge, the likelihood of forming an air pocket is substantially reduced.

In an alternate embodiment (not shown), tube 84 extends upwardly the full length of the cartridge and is provided with a plurality of apertures adjacent the upper edge thereof. The apertures permit fluid and air to enter the tube, preventing the formation of air pockets. The scope of the subject invention is intended to include both embodiments.

A filter element 90 is provided which surrounds the central tube 84. The outer surface of filter element 90 is spaced away from the inner surface of the housing to define an interior channel 92. Due to the tapered construction of central tube 84, a channel 94 is defined between tube 84 and the filter element 90. Channel 94 functions to facilitate fluid flow and prevent clogging. Filter element 90 is preferably formed from a multilayered paper material to provide adequate absorption and removal of particulates.

Cartridge 32 is provided with a fluid impervious bottom wall 96, that extends outwardly from the central tube 84. Bottom wall 96 is located below the bottom surface of filter element 90 and is spaced above the top surface of plate 20 to define another channel 98, therebetween. Preferably, cartridge 32 is also provided with a secondary bottom wall 100 for more accurately defining channel 98. Bottom wall 100 is provided with apertures 102 to guide the fluid flow from the passageways 28 in plate 20 into channels 98 and 92.

Once the fluid flow has passed upwardly out of sediment chamber 30, a large portion of the water will already have been separated from the fuel. Cartridge 32 functions to further remove water, and in addition, separates our any particulates entrained in the flow from entering the engine.

As discussed above, fuel passing upwardly up from the sediment chamber is channeled through passageways 28 formed in the plate and into the cartridge 32. As illustrated by arrows D in FIG. 2, the fluid flow is guided through secondary bottom wall 100 and into channels 98. As the fluid is forced upwardly, a portion impinges on the bottom of secondary wall 100, such that additional coalesence occurs. The water droplets so formed will drop downwardly to be captured by cup 50 and returned to the bottom of the sediment chamber.

The fuel flow which is traveling through channel 92 will enter filter element 90. During its passage through the filter, additional water will be removed along with any particulates. The fluid flow will then move through channel 94 and into central tube 84. In the illustrated embodiment, access to tube 84 can only be made through fluid entry means 86, located at the upper end thereof. Because entry means 86 is located only adjacent to the upper end of the tube, any air pockets which would tend to form adjacent the upper end of the cartridge tend to be reentrained in the high speed flow of fuel occurring at this juncture. Accordingly, the likelihood of an air pocket building up in this area is substantially diminished. The flow of fuel will then travel downwardly through tubular member 84 into outlet port 26, exiting into the fuel line of the vehicle.

In summary, there has been provided a new and improved apparatus 10 for filtering fuel, particularly adapted for use with diesel engines. The subject apparatus includes an improved baffle system 34 for increasing the efficiency of separation. In addition, a unique cartridge 32 means is disclosed which is removably mounted and can be replaced without having to provide any additional clearance area.

The subject apparatus includes a sediment chamber 32 having an open upper end which is covered by a plate 20. The plate is provided with inlet and outlet ports 24, 26 as well as passageways 28 permitting fluid to pass from the sediment chamber upwardly into a cartridge mounted on the plate. The baffle system 34 is mounted in the sediment chamber at the end of the inlet port. The baffle system includes a cup 50 having an open upper end and a bottom wall 56 with apertures 60 formed therein. In use, water droplets which would tend to be caught into the upward flow of fuel are instead captured by the cup and returned directly to the sediment chamber. By this arrangement, the likelihood of reentrainment of the water is substantially reduced. In the preferred embodiment, a conically shaped plug member 68 is coaxially mounted at the end of the inlet port. The plug member 68, in combination with the bottom wall of the cup, functions to force the fluid flow through two direction reversals and provides a pair of impingement surfaces to enhance the separation of the fluids.

The cartridge 34 of the subject invention includes a central tube 84 having a fluid entry means located at the upper end thereof. A filter element 90 surrounds the central tube and extends to a point adjacent the side wall the cartridge. A fluid impervious bottom wall 96 is disposed at the bottom of the filter and spaced away from the plate 20. In use, the fluids entering the cartridge through the passageways in the plate are channeled through the filter means and into the tube via the fluid entry means located at the upper end thereof. The fluid entry means functions to reduce the formation of air pockets.

While the subject invention has been described with reference to a preferred embodiment, it is to be understood that various other changes and modifications could be made therein, by one skilled in the art, without varying from the scope and spirit of the subject invention as defined by the appended claims.

I claim:

1. An improved baffle system for use in an apparatus for separating higher density fluids from lower density fluids wherein said apparatus includes a sediment chamber having an open upper end, said apparatus further including a filter means mounted above and in sealing engagement with said chamber, said apparatus further including an inlet port in communication with said chamber and an outlet port for channeling fluid outwardly from said filter means, said baffle system comprising:

a central tubular member in communication with said inlet port and extending into said sediment chamber; and cup means disposed concentrically around said central tubular member, said cup means having an open upper end and a bottom wall formed integrally with the outer surface of said tubular member, said bottom wall having a plurality of apertures formed therein, and with the side wall of said cup means being spaced away from the inner surface of said chamber to define a channel therebetween, such that fluid entering said chamber through said central tubular member flows upwardly through said channel towards said filter means whereby heavier density fluids which drop downwardly from the area of said filter means are caught in said cup means and pass through the apertures formed in the bottom wall thereof into said chamber thereby reducing the likelihood of reentrainment in the upward flow of fluids.

2. A baffle system as recited in claim 1 further including a generally conical plug member coaxially mounted adjacent the end of said center tubular member which extends into said chamber, with the apex of said conical plug member pointing towards the bottom of said sediment chamber whereby the configuration of said plug member causes the flow path of the fluids entering said chamber to be deflected back upwardly into the bottom wall of the cup means which in turn functions to redirect the flow towards the bottom of said sediment chamber, such that circuitous path enhances the separation between liquids.

3. A baffle system as recited in claim 2 wherein the bottom wall of said cup means is provided with a frusto-conical configuration, with the apex thereof pointing upwardly such the configuration of said bottom wall facilitates the channeling of fluids.

4. A baffle system as recited in claim 3 wherein the upper surface of said plug member includes a plurality of radially projecting flutes, disposed partially within the open end of said central tubular member, said flutes for directing the fluid flow.

5. A baffle system as recited in claim 1 wherein the walls of said cup means slant outwardly towards the open end thereof.

6. An improved apparatus capable of separating low density fluids from high density fluids particularly adapted for use with a vehicle fuel filter, said apparatus including a sediment chamber having an open upper end covered by a plate means, with the plate means having a fluid inlet port in communication with the chamber and a fluid outlet port, said plate means having a passageway formed therein to permit fluid to flow upwardly from said chamber therethrough, said improvement comprising:

elongated cartridge means enabling one step, screw-off removability, while eliminating the formation of air pockets, said cartridge means being threadably mounted on said plate means and covering said passageway therein, said threadable mounting providing one step screw-off removability, said cartridge means including;

an elongated central tube with the lower end thereof being in communication with the outlet port of said plate means, and with said central tube having a fluid entry means located adjacent the upper end thereof, said fluid entry means for inhibiting the formation of air pockets; and a tubular filter element surrounding said central tube, such that fluid leaving said chamber passes through the passageway in said plate means and into said filter element of said cartridge means, whereupon said fluid enters the upper end of said central tube through said entry means prior to exiting said tube through said outlet port.

7. An apparatus as recited in claim 6 wherein the upper end of said central tube is spaced from the top of said cartridge means to define said fluid entry means.

8. An apparatus as recited in claim 6 wherein the lower end of said central tube is threadably mounted to said plate means to facilitate replacement thereof.

9. An apparatus as recited in claim 6 wherein said central tube is tapered towards the upper end thereof in a manner to define a channel between said central tube and said filter element.

10. An apparatus as recited in claim 6 wherein said cartridge means further includes a fluid impervious bottom wall extending outwardly from said central tube, with the outer edge thereof being spaced from the inner surface of said cartridge means, said bottom wall being disposed below the bottom surface of said filter element and spaced above said plate means to define a channel therebetween whereby fluid leaving said chamber passes through the passageway in the plate means and is deflected by said wall towards the side wall of said cartridge prior to entering said filter element.

11. An apparatus as recited in claim 10 wherein said cartridge means further includes a secondary bottom wall disposed below said fluid impervious wall, said secondary bottom wall including apertures to permit the fluid to flow into said cartridge.

12. An apparatus as recited in claim 6 wherein said tubular filter element is formed from a paper material.

13. An apparatus as recited in claim 6 wherein the outer surface of said tubular filter element is spaced away from the inner surface of said cartridge.

* * * * *